United States Patent
Henahan

(10) Patent No.: US 8,267,639 B2
(45) Date of Patent: *Sep. 18, 2012

(54) SYSTEMS AND METHODS FOR PROVIDING COMPRESSOR EXTRACTION COOLING

(75) Inventor: James Henahan, Greenville, SC (US)

(73) Assignee: General Electric Company, Schenectady, NY (US)

( * ) Notice: Subject to any disclaimer, the term of this patent is extended or adjusted under 35 U.S.C. 154(b) by 643 days.

This patent is subject to a terminal disclaimer.

(21) Appl. No.: 12/415,078

(22) Filed: Mar. 31, 2009

(65) Prior Publication Data

US 2010/0247285 A1 Sep. 30, 2010

(51) Int. Cl.
 *F04D 29/58* (2006.01)
(52) U.S. Cl. .............. 415/1; 415/116; 60/782
(58) Field of Classification Search ............. 415/144, 415/179; 60/39.55, 39.58, 782, 785
 See application file for complete search history.

(56) References Cited

U.S. PATENT DOCUMENTS

| | | | |
|---|---|---|---|
| 6,581,368 B2 | 6/2003 | Utamura | |
| 6,598,401 B1 | 7/2003 | Utamura | |
| 6,609,360 B2 | 8/2003 | Utamura | |
| 6,644,035 B1 | 11/2003 | Yamanaka et al. | |
| 6,990,815 B2 | 1/2006 | Yamanaka et al. | |
| 7,367,178 B2 | 5/2008 | Shibata | |
| 2003/0051481 A1* | 3/2003 | Priestley | 60/782 |
| 2007/0204625 A1* | 9/2007 | Thatcher et al. | 60/782 |

OTHER PUBLICATIONS

Disclosure Statement Under 37 C.F.R. 1.56 as filed Mar. 31, 2009.

* cited by examiner

*Primary Examiner* — Stephen W Smoot
(74) *Attorney, Agent, or Firm* — Sutherland Asbill & Brennan LLP

(57) ABSTRACT

Embodiments of methods and apparatus for providing compressor extraction cooling are provided. According to one example embodiment, a method for providing compressor extraction cooling in a gas turbine comprising a compressor and a turbine section can be provided. The method can include providing a cooling medium. The method can include extracting air from a compressor associated with a gas turbine. The method can also include introducing the cooling medium to the compressor extraction air, wherein the compressor extraction air is cooled by the cooling medium prior to or during introduction to the turbine section.

18 Claims, 3 Drawing Sheets

SYSTEMS AND METHODS FOR PROVIDING COMPRESSOR EXTRACTION COOLING

FIELD OF THE INVENTION

The invention relates to rotating machinery, and more specifically relates to systems and methods for providing compressor extraction cooling.

BACKGROUND OF THE INVENTION

Generally, cooling air extracted from a compressor section of a gas turbine can cause a decrease in overall performance of the gas turbine. When the amount of extracted cooling air is decreased, an increase in the overall performance of the gas turbine can result but a reduction in the life of gas turbine components can also result.

At least one conventional gas turbine uses cooled cooling air extracted from a compressor section to cool various hot gas path components, for instance, in a turbine section. In the conventional gas turbine, a heat exchanger using water from the plant bottoming cycle can cool the air extracted from the compressor. By initially passing the air extracted from the compressor through the heat exchanger, the heat exchanger, by way of the water from the plant bottoming cycle, can remove heat from the air before the air is transmitted to the turbine section. Use of a heat exchanger to cool the extracted compressor air can be relatively expensive due to the maintenance and operation costs of the heat exchanger and associated equipment.

Accordingly, there is need for systems and methods for providing compressor extraction cooling.

BRIEF DESCRIPTION OF THE INVENTION

Embodiments of the invention can address some or all of the needs described above. According to one embodiment of the invention, there is disclosed a method for providing compressor extraction cooling. The method can include providing a cooling medium. The method can include extracting air from a compressor associated with a gas turbine. The method can also include introducing the cooling medium to the compressor extraction air, wherein the compressor extraction air is cooled by the cooling medium prior to or during introduction to the turbine section.

According to another embodiment of the invention, there is disclosed a system for providing compressor extraction cooling. The system can include one or more storage devices operable to store a cooling medium. In addition, the system can include one or more distribution devices operable to receive the cooling medium from the one or more storage devices. The one or more distribution devices can be further operable to introduce at least a portion of the cooling medium prior to or during introduction of the cooling medium to the compressor extraction air, wherein the compressor extraction air is cooled by the cooling medium prior to introduction to the turbine section.

According to yet another embodiment of the invention, there is disclosed a gas turbine. The gas turbine can include a turbine section and a compressor, wherein air is extracted from at least one portion of the compressor for introduction into the turbine section. The gas turbine can also include one or more storage devices operable to store a cooling medium. The gas turbine can also include one or more distribution devices operable to receive the cooling medium from the one or more storage devices. In addition, the one or more distribution devices can be further operable to introduce at least a portion of a cooling medium prior to or during introduction of the cooling medium to the air extracted from the at least one portion of the compressor, wherein the air is cooled by the cooling medium prior to introduction to the turbine section.

Other embodiments, aspects, and features of the invention will become apparent to those skilled in the art from the following detailed description, the accompanying drawings, and the appended claims.

BRIEF DESCRIPTION OF THE DRAWINGS

Figure 1:
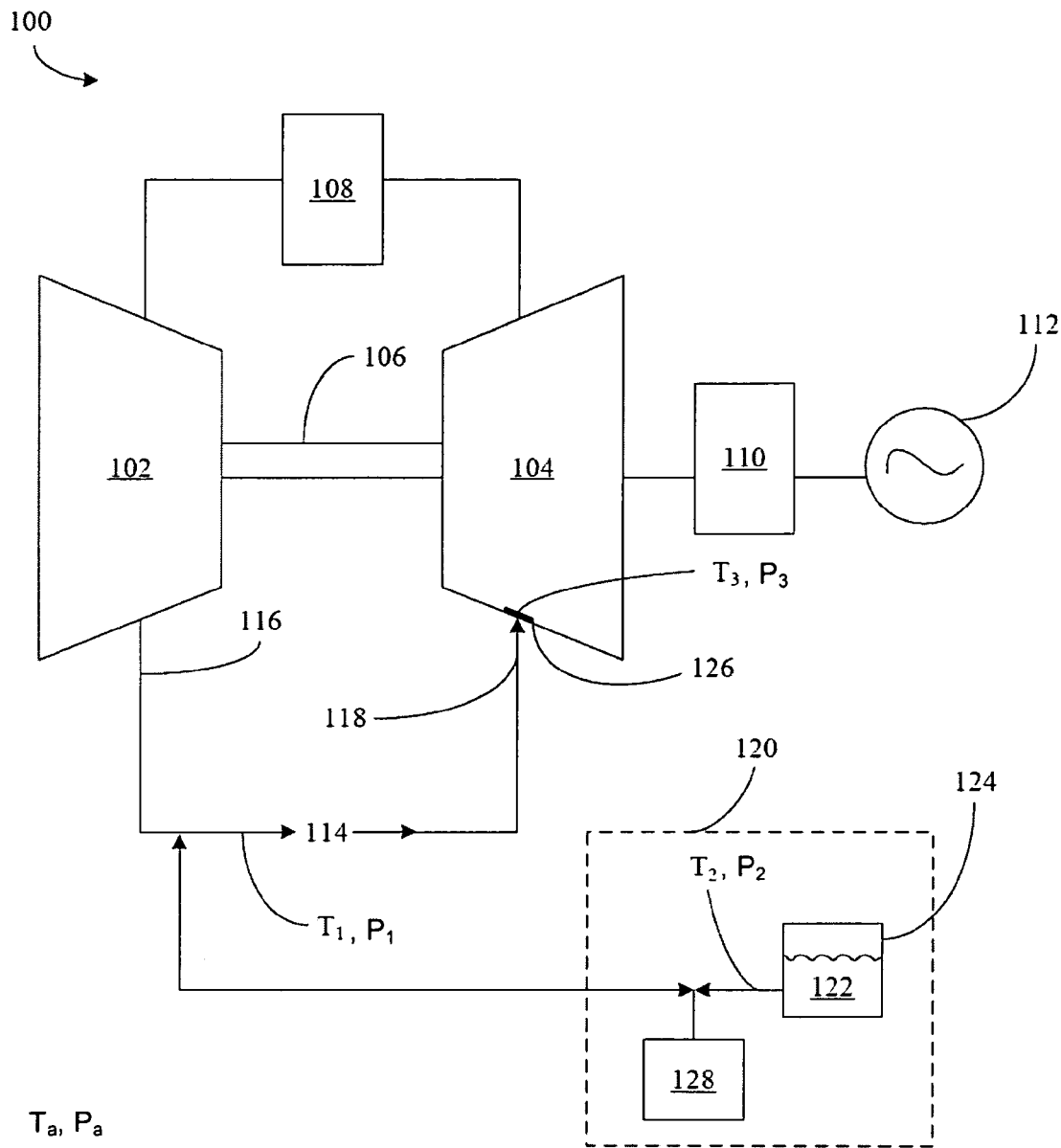

Having thus described the invention in general terms, reference will now be made to the accompanying drawings, which are not necessarily drawn to scale, and wherein:

FIG. 1 illustrates a schematic view of an example system and gas turbine in accordance with an embodiment of the invention.

Figure 2:
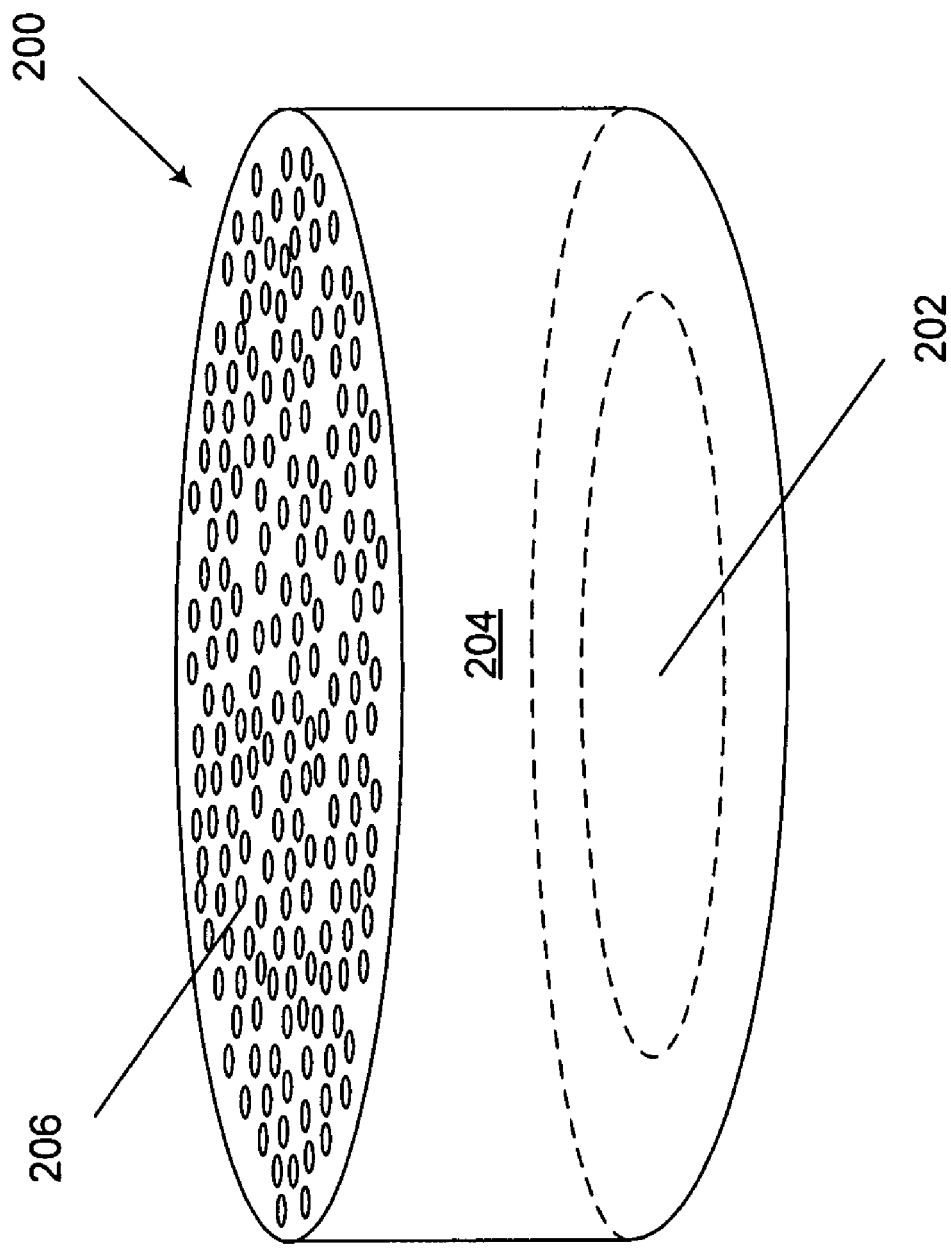

FIG. 2 illustrates an example distribution device for a system and gas turbine in accordance with an embodiment of the invention.

Figure 3:
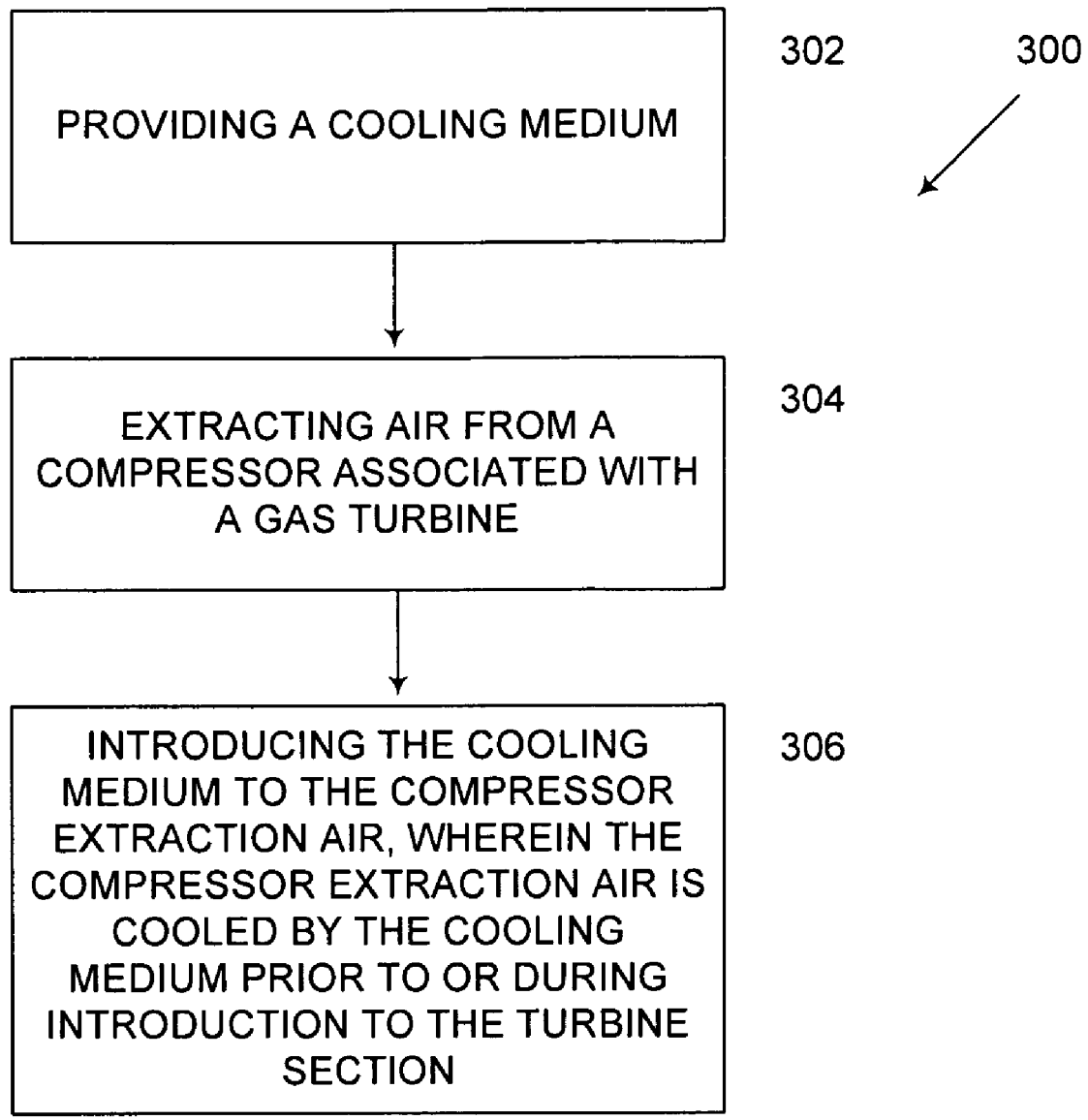

FIG. 3 illustrates an example method in accordance with an embodiment of the invention.

DETAILED DESCRIPTION OF THE INVENTION

Illustrative embodiments of the invention now will be described more fully hereinafter with reference to the accompanying drawings. Indeed, the invention may be embodied in many different forms and should not be construed as limited to the embodiments set forth herein; rather, these embodiments are provided so that this disclosure will satisfy applicable legal requirements. Like numbers refer to like elements throughout.

Disclosed are systems and methods for providing compressor extraction cooling. In one embodiment, a method can include providing a cooling medium. The method can include extracting air from a compressor associated with a gas turbine. The method can also include introducing the cooling medium to the compressor extraction air, wherein the compressor extraction air is cooled by the cooling medium prior to or during introduction to the turbine section. According to another embodiment of the invention, a system for providing compressor extraction cooling can be provided. The system can include one or more storage devices operable to store a cooling medium. In addition, the system can include one or more distribution devices operable to receive the cooling medium from the one or more storage devices. The one or more distribution devices can be further operable to introduce at least a portion of the cooling medium prior to or during introduction of the cooling medium to the compressor extraction air, wherein the compressor extraction air is cooled by the cooling medium prior to introduction to the turbine section. In either embodiment, new an/or retrofitted gas turbines utilizing certain embodiments of the system and/or method can be operated at approximately the rated firing temperature at relatively hot ambient temperatures. Thus, as a result of the reduced temperature of the compressor extraction air, certain embodiments of the system and method as well as associated gas turbines can have the technical effect of improving gas turbine performance and maintaining or otherwise increasing gas turbine component life.

FIG. 1 illustrates a schematic view of an example system and gas turbine in accordance with an embodiment of the invention in accordance with an embodiment of the invention. FIG. 1 shows certain components of an example gas turbine 100, which includes a compressor 102, a turbine 104, a shaft 106 connecting the compressor 102 and turbine 104, and a combustor 108. In the embodiment shown in FIG. 1, the compressor 102 compresses and discharges gas, and the combustor 108 receives the compressed gas to initiate a combustion process. Combustion gases from the combustor 108 drive the turbine 104, which turn the shaft 106 to drive a generator 110. The generator 110, in turn, generates power for output to an electric grid 112. In the embodiment shown in FIG. 1, air 114 from the compressor can be extracted from one or more stages 116 associated with the compressor 102. The air 114 from such stages 116 can generally be referred to as "compressor extraction air." Generally, the compressor extraction air can be routed to or otherwise transmitted to one or more portions 118 of the turbine 104, where the air 114 can cool relatively hot gas path components associated with the turbine 104.

As shown in FIG. 1, temperatures and pressures associated with certain portions of the gas turbine 100 are respectively indicated by T1, T2, T3, P1, P2, and P3. For example, the temperature of the compressor extraction cooling air is indicated as T1, and the pressure of the compressor extraction cooling air is indicated as P1. Other temperatures T2 and T3, and pressures P2 and P3 are described in further detail below. Ambient temperature and pressure, Ta and Pa, are indicated and measured outside of the gas turbine 100. These and other temperatures and pressures throughout the gas turbine 100 can be measured or otherwise obtained by respective sensors, thermocouples, or other monitoring devices.

Also shown in FIG. 1, a compression extraction air system 120 can be mounted to or can otherwise be retrofitted to the gas turbine 100. The system 120 can include a supply of one or more cooling mediums, such as water 122. The one or more cooling mediums, such as water 122, can be stored in one or more respective storage devices 124. In other embodiments, multiple cooling mediums can be stored in respective storage devices similar to 124. The temperature of the cooling medium, or water 122 in this example, is indicated by T2.

In certain embodiments, a cooling medium can include, but is not limited to, water, a fluid, a gas, or any liquid or compressed gas.

In certain embodiments, a storage device can include, but is not limited to, a tank, a reservoir, or any other device capable of storing said cooling medium. In some embodiments, a cooling medium may be stored off site or remote to the gas turbine, and may be periodically or continuously transmitted to the gas turbine via piping or other suitable devices.

Also shown in FIG. 1, the system 120 can include one or more distribution devices 126 in communication with the one or more storage devices 124. In this embodiment, the one or more distribution devices 126 can receive at least a portion of the cooling medium, such as water 122, from the one or more storage devices 124. The one or more distribution devices 126 can be further operable to introduce at least a portion of the received cooling medium or water 122 to the compressor extraction air 114, wherein the compressor extraction air 114 is cooled by the cooling medium or water 122 prior to or during introduction to the turbine 104. In other embodiments, multiple distribution devices can introduce multiple, respective cooling mediums, such as from multiple storage devices, to the compressor extraction air 114. In any instance, the relatively cooler temperature T2 of the cooling medium, in this example water 122, can reduce the relatively hotter temperature T1 of the compressor extraction air 114 to a temperature T3 during the introduction to the turbine 104. In this example, T1 and P1 are known as dry measurements since the measurements are taken prior to introduction of a cooling medium to the compressor extraction air, and T3 and P3 are known as wet measurements since the measurements are taken during or after introduction of the cooling medium to the compressor extraction air. Thus, as a result of the reduced temperature of the compressor extraction air, example embodiments of the system can have the technical effect of substantially increasing turbine performance.

In one embodiment, a cooling medium, such as water 122, can be introduced into the turbine 104 by direct injection. When the cooling medium is directly injected into the turbine 104, no introduction of the cooling medium to the compressor extraction air may be needed, and a similar technical effect to the embodiment above can be achieved, that is, to substantially increase turbine performance. In such an embodiment, one or more distribution devices similar to 200 can be used for direct injection of a cooling medium.

In another embodiment, a combination of direct injection of a cooling medium into the turbine 104 and introduction of a cooling medium into the compressor extraction air can be performed. When a combination is used, the two cooling mediums can be the same or different from each other.

In certain embodiments, a distribution device can include, but is not limited to, an atomizer, a fogger, a spritzing device, a nozzle, a manifold, or any other device capable of distributing a cooling medium.

Also shown in FIG. 1, the compression extraction air system 120 can include one or more processors 128 operable to control the one or more distribution devices 126 and the respective rates of introduction of the cooling medium, such as water 122, to the air 114 extracted from the at least one portion of the compressor 102. In this embodiment, the one or more processors 128 can obtain feedback from any number of sensors positioned throughout the gas turbine 100 to control or otherwise operate the one or more distribution devices 126.

FIG. 2 illustrates an example distribution device for the system and gas turbine in accordance with an embodiment of the system. The distribution device 200 shown in FIG. 2 can include, for example, an inlet 202, a nozzle head 204, and a distribution portion 206. In the example shown in FIG. 2, the distribution device 200 can mount to a portion of a gas turbine, such as 100 in FIG. 1, between at least one compressor stage, such as 116 in FIG. 1, and at least one portion of the turbine, such as 118 in FIG. 1. As shown in FIG. 2, the inlet 202 can receive at least one cooling medium, such as water 120 in FIG. 1. The nozzle head 204, in communication with the inlet 202, can receive the at least one cooling medium, such as water 120, from the inlet 202. The distribution portion 206, in communication with the nozzle head 204, can distribute the at least one cooling medium, such as water 120, and introduce at least a portion of the at least one medium, such as water 120, to a turbine section, such as 104 in FIG. 1.

In one embodiment, a distribution device such as 200 can be mounted within associated piping carrying the compressor extraction air. In such instances, the distribution device may be inserted into the piping by creating a hole in the existing compressor extraction piping. The compressor extraction air can flow around the distribution device, thereby mixing with and carrying the cooling medium downstream towards the turbine section.

FIG. 3 is a flowchart illustrating an example method 300 for providing compressor extraction cooling in a gas turbine in accordance with an embodiment of the invention. In the embodiment shown, the example method 300 can be implemented to cool compressor extraction air associated with a gas turbine, such as the gas turbine 100 in FIG. 1.

The example method begins at block 302. At block 302, a cooling medium is provided. In this embodiment, the cooling medium provided can be water, such as 122 in FIG. 1, stored in one or more respective storage devices 124.

In one aspect of an embodiment, providing a cooling medium can include providing one or more distribution devices operable to distribute at least a portion of the cooling medium prior to or during introduction of the cooling medium to the compressor extraction air.

Block 302 is followed by block 304, in which air from a compressor associated with a gas turbine is extracted. In this embodiment, air such as 114 in FIG. 1 from a compressor such as 102 can be extracted from one or more stages such as 116 associated with the compressor 102.

Block 304 is followed by block 306, in which the cooling medium is introduced to the compressor extraction air, wherein the compressor extraction air is cooled by the cooling medium prior to or during introduction to the turbine section. In this embodiment, one or more distribution devices such as 126 in FIG. 1 can introduce at least a portion of the received cooling medium or water 122 to the compressor extraction air 114, wherein the compressor extraction air 114 is cooled by the cooling medium or water 122 prior to or during introduction to the turbine such as 104.

In one aspect of an embodiment, introducing the cooling medium to the compressor extraction air comprises distributing at least a portion of the cooling medium and introducing at least the distributed portion of the cooling medium to the compressor extraction air.

In one aspect of an embodiment, introducing the cooling medium to the compressor extraction air is controlled by at least one processor.

In one embodiment, the method 300 can include mounting one or more distribution devices to the gas turbine, wherein the one or more distribution devices can distribute at least a portion of the cooling medium prior to or during introduction of the cooling medium to the compressor extraction air.

In one embodiment, the method 300 can include mounting one or more storage devices to the gas turbine, wherein the one or more storage devices can store the cooling medium.

In one embodiment, the method 300 can include distributing at least a portion of the cooling medium prior to or during introduction of the cooling medium to the compressor extraction air, wherein the compressor extraction air is cooled by the distributed cooling medium prior to introduction to the turbine section.

In one aspect of an embodiment, the cooling medium can include at least one of the following: water, a fluid, a gas, or any liquid or compressed gas.

The method 300 ends after block 306.

The example elements of FIG. 3 are shown by way of example, and other process embodiments can have fewer or greater numbers of elements, and such elements can be arranged in alternative configurations in accordance with other embodiments of the invention.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims.

This written description uses examples to disclose the invention, including the best mode, and also to enable any person skilled in the art to practice the invention, including making and using any devices, apparatus, or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The claimed invention is:

1. A method for providing compressor extraction cooling in a gas turbine comprising a compressor and a turbine section, the method comprising:
   providing a cooling medium from at least one distribution device, wherein the at least one distribution device comprises at least one of the following: an atomizer, a fogger, a spritzing device, a nozzle, or a manifold;
   extracting air from a compressor associated with a gas turbine; and
   introducing the cooling medium to the compressor extraction air, wherein the compressor extraction air is cooled by the cooling medium prior to or during introduction to the turbine section.

2. The method of claim 1, further comprising:
   mounting one or more distribution devices to the gas turbine, wherein the one or more distribution devices can distribute at least a portion of the cooling medium prior to or during introduction of the cooling medium to the compressor extraction air.

3. The method of claim 1, further comprising:
   mounting one or more storage devices to the gas turbine, wherein the one or more storage devices can store the cooling medium.

4. The method of claim 1, further comprising:
   distributing at least a portion of the cooling medium prior to or during introduction of the cooling medium to the compressor extraction air, wherein the compressor extraction air is cooled by the distributed cooling medium prior to introduction to the turbine section.

5. The method of claim 1, wherein providing a cooling medium comprises providing one or more distribution devices operable to distribute at least a portion of the cooling medium prior to or during introduction of the cooling medium to the compressor extraction air.

6. The method of claim 1, wherein introducing the cooling medium to the compressor extraction air comprises distributing at least a portion of the cooling medium and introducing at least the distributed portion of the cooling medium to the compressor extraction air.

7. The method of claim 1, wherein introducing the cooling medium to the compressor extraction air is controlled by at least one processor.

8. The method of claim 1, wherein the cooling medium comprises at least one of the following: water, a fluid, a gas, a liquid, or a compressed gas.

9. A system for cooling compressor extraction air in a gas turbine comprising a compressor and a turbine section, the system comprising:
   one or more storage devices operable to store a cooling medium;
   one or more distribution devices operable to:
      receive the cooling medium from the one or more storage devices; and
      introduce at least a portion of the cooling medium prior to or during introduction of the cooling medium to the compressor extraction air, wherein the compressor extraction air is cooled by the cooling medium prior to introduction to the turbine section,
   wherein the one or more distribution devices comprise at least one of the following: an atomizer, a fogger, a spritzing device, a nozzle, or a manifold.

10. The system of claim 9, further comprising:
one or more processors operable to control the one or more distribution devices and respective rates of introduction of the cooling medium to the compressor extraction air.

11. The system of claim 9, wherein the one or more distribution devices is further operable to:
distribute at least a portion of the cooling medium prior to or during introduction of the cooling medium to the compressor extraction air, wherein the compressor extraction air is cooled by the distributed cooling medium prior to introduction to the turbine section.

12. The system of claim 9, wherein the one or more storage devices operable to store a cooling medium comprise at least one of the following: a tank, or a reservoir.

13. The system of claim 9, wherein the cooling medium comprises at least one of the following: water, a fluid, a gas, a liquid, or compressed gas.

14. A gas turbine comprising:
a turbine section;
a compressor, wherein air is extracted from at least one portion of the compressor for introduction into the turbine section;
one or more storage devices operable to store a cooling medium; and
one or more distribution devices operable to:
receive the cooling medium from the one or more storage devices; and
introduce at least a portion of a cooling medium prior to or during introduction of the cooling medium to the air extracted from the at least one portion of the compressor, wherein the air is cooled by the cooling medium prior to introduction to the turbine section,
wherein the one or more distribution devices comprise at least one of the following: an atomizer, a fogger, a spritzing device, a nozzle, or a manifold.

15. The gas turbine of claim 14, further comprising:
one or more processors operable to control the one or more distribution devices and respective rates of introduction of the cooling medium to the air extracted from the at least one portion of the compressor.

16. The gas turbine of claim 14, wherein the one or more storage devices operable to store a cooling medium comprise at least one of the following: a tank, or a reservoir.

17. The gas turbine of claim 14, wherein the one or more distribution devices is further operable to:
distribute at least a portion of the cooling medium prior to or during introduction of the cooling medium to the air extracted from the at least one portion of the compressor, wherein the air is cooled by the distributed cooling medium prior to introduction to the turbine section.

18. The gas turbine of claim 14, wherein the cooling medium comprises at least one of the following: water, a fluid, a gas, a liquid, or a compressed gas.

* * * * *